(12) United States Patent  (10) Patent No.: US 7,815,509 B2
Yamaya et al.  (45) Date of Patent: Oct. 19, 2010

(54) GAME APPARATUS AND CONTROL METHOD

(75) Inventors: Takeshi Yamaya, Tokyo (JP); Yuji Sugimori, Tokyo (JP); Motohiko Higashiguchi, Tokyo (JP); Tomoyuki Goto, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 786 days.

(21) Appl. No.: 11/650,219

(22) Filed: Jan. 4, 2007

(65) Prior Publication Data

US 2007/0161425 A1 Jul. 12, 2007

(30) Foreign Application Priority Data

Jan. 6, 2006 (JP) .............................. 2006-001839

(51) Int. Cl.
*G06F 17/00* (2006.01)
(52) U.S. Cl. ....................................................... 463/46
(58) Field of Classification Search ..................... 463/1, 463/6–9, 16–20, 25, 42, 46
See application file for complete search history.

(56) References Cited

U.S. PATENT DOCUMENTS

| 5,060,932 | A | | 10/1991 | Yamaguchi |
| 6,110,039 | A | * | 8/2000 | Oh ................................. 463/2 |
| 6,117,007 | A | * | 9/2000 | Matsuyama et al. ............ 463/6 |
| 6,117,008 | A | * | 9/2000 | Machiguchi .................... 463/6 |
| 6,509,896 | B1 | | 1/2003 | Saikawa et al. |
| 6,554,704 | B2 | * | 4/2003 | Nicastro et al. ............... 463/20 |
| 7,326,115 | B2 | * | 2/2008 | Baerlocher ................... 463/25 |
| 7,413,514 | B2 | * | 8/2008 | Saikawa et al. ............... 463/46 |
| 2002/0022508 | A1 | | 2/2002 | Ikariko |
| 2002/0068640 | A1 | | 6/2002 | Uemura et al. |
| 2006/0002567 | A1 | * | 1/2006 | Yusa et al. .................... 381/58 |

FOREIGN PATENT DOCUMENTS

| EP | 0 952 555 A1 | 10/1999 |
| EP | 1 184 060 A1 | 3/2002 |
| JP | 11-086038 A | 3/1999 |
| JP | 2003-190626 A | 7/2003 |
| WO | WO 92/21117 A1 | 11/1992 |
| WO | WO 94/23406 1 A | 10/1994 |

* cited by examiner

*Primary Examiner*—Ronald Laneau
(74) *Attorney, Agent, or Firm*—Drinker Biddle & Reath LLP (57) ABSTRACT

A game apparatus and associated method comprises means for controlling development of a game based on a game program, a number of displays for displaying game images, a seat for game players to sit on, a number of audio outputs, a rotating table upon which the seat and audio outputs are mounted on, means for calculating rotation angle of the rotating table as the game develops and rotating the rotating table based on this rotation angle, and means for changing conditions of audio output outputted from the audio output sections and controlling assigned position of a sound field of stereophonic sound based on rotating table rotation angle information.

20 Claims, 6 Drawing Sheets

GAME APPARATUS AND CONTROL METHOD

CROSS REFERENCE TO RELATED APPLICATIONS

This application claims the priority of the Japanese Patent Application No. 2006-001839, filed Jan. 6, 2006 in the Japanese Patent Office, which is incorporated herein by reference in its entirety.

BACKGROUND OF THE INVENTION

1. Field of the Invention

The present invention relates to game apparatus and a control method thereof, and particularly relates to a game apparatus and control method thereof where an image and audio are respectively outputted by a screen and audio output sections provided within an enclosure in a manner corresponding to development of a game.

2. Description of Related Art

Currently, game apparatus capable of housing game players within an enclosure, installed with a large type screen for displaying images, a number of speakers for creating stereophonic sound, and a simulated gun operated by a game player have been proposed and are being implemented (for example, refer to patent document 1). In such game apparatus, a game player is able to enjoy a game involving shooting a gun by operating a simulated gun in line with an image changing as the game develops.

Further, in recent years, in order to improve realism, development has been proceeding in game apparatus (game apparatus with a rotating seat) where a seat for a game player to sit on is installed within an enclosure in a freely rotating manner, with screens being arranged to the front and rear of the seat and a plurality of speakers being installed in the vicinity of the seat, and with the seat and speakers then being rotated in line with images changing as the game develops.

[Patent Document 1] Japanese Patent Laid-open Publication No. Hei. 11-86038.

However, with the game apparatus with a rotating seat described above, there are cases where disparities between a condition displayed in an image shown on a screen and a condition outputted for audio outputted from the speakers occur as a result of the speakers installed in the vicinity of the seat rotating together with the seat.

For example, in the event that a pair of left and right front speakers are installed at positions in the vicinity of the seat towards the front and a pair of left and right rear speakers are installed at positions in the vicinity of the seat towards the rear, in the event that an image for an object approaching from the rear to the front is displayed on the right side of the front screen, then audio is to be controlled in such a manner that a loud sound is outputted from the nearest speaker to the right side of the front screen. However, there may also be cases where, as the game develops, at the same time as displaying this kind of image, the seat is rotated through 180° so that the game player is facing towards the rear. When no kind of audio control is carried out in this case, a loud sound is outputted from the speaker moved towards the rear screen side as a result of being rotated through approximately 180° together with the seat. This causes a disparity between the image displayed and the audio outputted and there is the fear that this may subject the game player to discomfort.

In order to resolve this situation, it is advantageous for the present invention to subject a game player to audiovisual synergetic effects so as to increase the sense of realism by ensuring that a condition displayed in images and a condition outputted for audio match in game apparatus configured so that the positions of a seat and audio output means with respect to screens installed within an enclosure change in a relative manner.

SUMMARY OF THE INVENTION

In order to bring about this advantage, first game apparatus of the present invention comprises game control means for controlling development of a game based on a predetermined game program, image generating means for generating game images based on development of the game controlled by the game control means, a plurality of display means for displaying the game images generated by the image generating means, a seat for a game player to sit on, a plurality of audio output means, position changing means for calculating an amount of change for at least one of orientation and relative positional relationship of the seats and the audio output means with respect to the plurality of display means in accompaniment with development of the game by the game control means, and changing at least one of the orientation and relative positional relationship of the seat and the audio output means with respect to the plurality of display means based on calculated amount of change, and stereophonic sound control means for changing conditions of audio output outputted from the plurality of audio output means and controlling assigned position of a sound field of stereophonic sound based on information relating to the amount of change.

Further, second game apparatus of the present invention may comprise game control means for controlling development of a game based on a predetermined game program, image generating means for generating game images based on development of the game controlled by the game control means, a plurality of display means for displaying the game images generated by the image generating means, a seat for a game player to sit on, a plurality of audio output means, position changing means for changing at least one of orientation and relative positional relationship of the seat and the audio output means with respect to the plurality of display means in accompaniment with the development of the game by the game control means, detection means for detecting an amount of change of at least one of orientation and relative positional relationship of the seat and the audio output means with respect to the plurality of display means, and stereophonic sound control means for changing conditions of audio output outputted from the plurality of audio output means and controlling assigned position of a sound field of stereophonic sound based on information relating to the amount of change detected by the detection means.

A third game apparatus of the present invention may also comprise control means for controlling development of an image story based on a predetermined game program, image generating means for generating images based on image story development controlled by the control means, at least two display means provided with display surfaces facing each other, for displaying the images generated by the image generating means, a seat for a game player to sit on, a plurality of audio output means, a rotating table with the seat and the audio output means provided between the display means, rotation control means calculating rotation angle of the rotating table with respect to at least two of the display means in accompaniment with development of the image story of the control means, and causing the rotating table to rotate based on calculated rotation angle, and stereophonic sound control means for changing conditions of audio output outputted from the plurality of audio output means and controlling assigned position of a sound field of stereophonic sound based on information relating to the rotation angle of the rotating table.

A fourth game apparatus of the present invention may also comprise control means for controlling development of an image story based on a predetermined game program, image generating means for generating images based on image story development controlled by the control means, at least two display means provided with display surfaces facing each other, for displaying the images generated by the image generating means, a seat for a game player to sit on, a plurality of audio output means, a rotating table with the seat and the audio output means provided between the display means, rotation control means causing the rotating table to rotate with respect to at least two of the display means in accompaniment with development of the image story of the control means, rotation angle detection means for detecting rotation angle of the rotating table, and stereophonic sound control means for changing conditions of audio output outputted from the plurality of audio output means and controlling assigned position of a sound field of stereophonic sound based on information relating to the rotation angle detected by the rotation angle detection means.

A first control method of the present invention is a control method for game apparatus having game control means for controlling development of a game based on a predetermined game program, image generating means for generating game images based on development of the game controlled by the game control means, a plurality of display means for displaying the game images generated by the image generating means, a seat for a game player to sit on, and a plurality of audio output means, comprising, a position changing step of calculating an amount of change for at least one of orientation and relative positional relationship of the seats and the output means with respect to the plurality of display means in accompaniment with development of the game by the game control means, and changing at least one of the orientation and relative positional relationship of the seat and the audio output means with respect to the plurality of display means based on calculated amount of change, and a stereophonic sound control step of changing conditions of audio output outputted from the plurality of audio output means and controlling assigned position of a sound field of stereophonic sound based on information relating to the amount of change.

Further, a second control method of the present invention may be a control method for game apparatus having game control means for controlling development of a game based on a predetermined game program, image generating means for generating game images based on development of the game controlled by the game control means, a plurality of display means for displaying the game images generated by the image generating means, a seat for a game player to sit on, and a plurality of audio output means, comprising, a position changing step of changing at least one of orientation and relative positional relationship of the seat and the audio output means with respect to the plurality of display means in accompaniment with the development of the game by the game control means, a detection step of detecting an amount of change of at least one of orientation and relative positional relationship of the seat and the audio output means with respect to the plurality of display means, and a stereophonic sound control step of changing conditions of audio output outputted from the plurality of audio output means and controlling assigned position of a sound field of stereophonic sound based on information relating to the amount of change detected by the detection step.

A third control method of the present invention may be a method of controlling game apparatus having control means for controlling development of an image story based on a predetermined game program, image generating means for generating images based on image story development controlled by the control means, at least two display means provided with display surfaces facing each other for displaying the images generated by the image generating means, a seat for a game player to sit on, a plurality of audio output means, and a rotating table with the seat and the audio output means provided between the display means, comprising, a rotation control step of calculating rotation angle of the rotating table with respect to at least two of the display means in accompaniment with development of the image story of the control means, and causing the rotating table to rotate based on calculated rotation angle, and a stereophonic sound control step of changing conditions of audio output outputted from the plurality of audio output means and controlling assigned position of a sound field of stereophonic sound based on information relating to the rotation angle of the rotating table.

A fourth control method of the present invention may be a method of controlling game apparatus having control means for controlling development of an image story based on a predetermined game program, image generating means for generating images based on image story development controlled by the control means, at least two display means provided with display surfaces facing each other, for displaying the images generated by the image generating means, a seat for a game player to sit on, a plurality of audio output means, and a rotating table with the seat and the audio output means provided between the display means, comprising, a rotation control step of causing the rotating table to rotate with respect to at least two of the display means in accompaniment with development of the image story of the control means, a rotation angle detection step of detecting rotation angle of the rotating table, and a stereophonic sound control step of changing conditions of audio output outputted from the plurality of audio output means and controlling assigned position of a sound field of stereophonic sound based on information relating to the rotation angle detected in the rotation angle detection step.

According to this configuration and method, it is possible to change conditions of audio output outputted from the plurality of audio output means and control assigned position of a sound field of stereophonic sound based on display conditions of images displayed at the plurality of display means and the relative positions of the seat (game player) and plurality of audio output means with respect to the plurality of display means. For example, when a pair of left and right audio output means are arranged at a position to the front of the seat, a pair of left and right audio output means are arranged to the rear of the seat, and an image of the object is displayed on the right side of the front screen, even in the event that the seat and the number of audio output means are made to move (the position is changed), output conditions for the audio can be controlled in such a manner that a large volume of audio can be outputted from audio output means that have moved to the closest position to the right side of the front screen. It is therefore possible to match image display conditions and audio output conditions, and it is possible to subject a game player to audiovisual synergetic effects so as to increase the sense of realism.

This game apparatus may adopt a configuration where the plurality of audio output means are provided at the seat or in the vicinity of the seat, or are provided in a manner integral with the seat or separate from the seat. In particular, the plurality of audio output means may be adopted having at least a pair of speakers fixed in a spaced manner to the left and right of the seat, or at least a pair of speakers mounted at the game player spaced to the left and right of the game player.

Further, at the game apparatus, the plurality of audio output means may also be adopted having a pair of left and right front speakers fixed in a spaced manner to the left and right to the front of the seat, and a pair of left and right rear speakers spaced to the left and right to the rear of the seat.

Further, at the game apparatus, it is possible to adopt the plurality of display means fixed (for example, fixed to the front and rear of the enclosure) so as to sandwich the seat. In this case, the position changing means can be adopted that simultaneously changes the relative positions of the seat and the plurality of audio output means with respect to the plurality of display means by simultaneously causing the seat and the plurality of audio output means to move.

Moreover, with the game apparatus, the image generating means may be adopted that generates an image of a predetermined object in three-dimensional virtual game space as viewed from a predetermined virtual frame of reference, and a plurality of display means displays images as viewed from the virtual frame of reference may also be adopted. In this case, the position changing means can be adopted that changes the relative positions of the seat and the plurality of audio output means with respect to the plurality of display means by causing the seat and the plurality of audio output means to rotate taking a predetermined center of rotation arranged within the enclosure as center. Further, in this case, it is possible to adopt the stereophonic sound control means that changes conditions of audio output, emitted from the object, outputted from the plurality of audio output means and controls assigned position of a sound field of stereophonic based on virtual distance information for between the position of the object in three-dimensional virtual space and the seat, and rotation angle information for the seat and the plurality of audio output means.

Further, at the game apparatus, it is possible to adopt the stereophonic sound control means that calculates a third coordinate that is a coordinate for the object in an enclosure coordinate system taking a predetermined position within the enclosure as an origin from a first coordinate that is a coordinate of the object in the three-dimensional virtual game space and a second coordinate that is a coordinate for the virtual frame of reference in the three-dimensional virtual game space, calculates a fourth coordinate that is a coordinate for the object in a seat coordinate system taking the center of rotation as an origin from the third coordinate and the rotation angle of the seat and the plurality of audio output means, determines a distance and direction from the game player(s) sitting on the seat to the object based on the fourth coordinate and changes conditions of audio output, emitted from the object, outputted from the plurality of audio output means and controls assigned position of a sound field of stereophonic based on the results of this determination.

According to the present invention, in game apparatus configured so that the position of the seat and audio output means can be changed in a relative manner with respect to screens installed within an enclosure, it is possible to make display conditions for images and output conditions for audio match. It is therefore possible to subject a game player to audiovisual synergetic effects so as to increase the sense of realism.

DESCRIPTION OF THE EMBODIMENT

Figure 1:
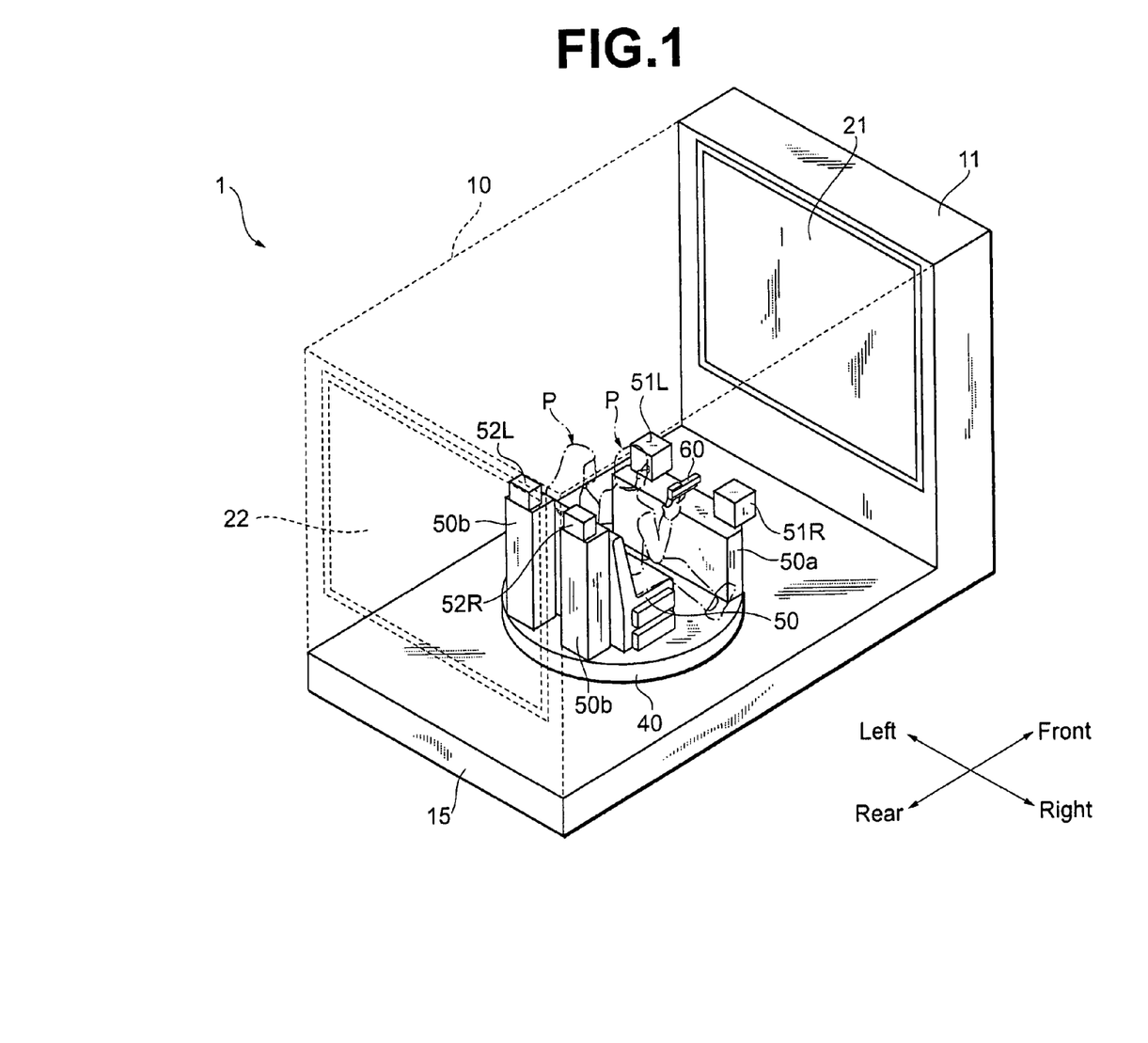
FIG. 1 is a perspective view showing essential parts of game apparatus of an embodiment of the present invention.
Figure 2A:
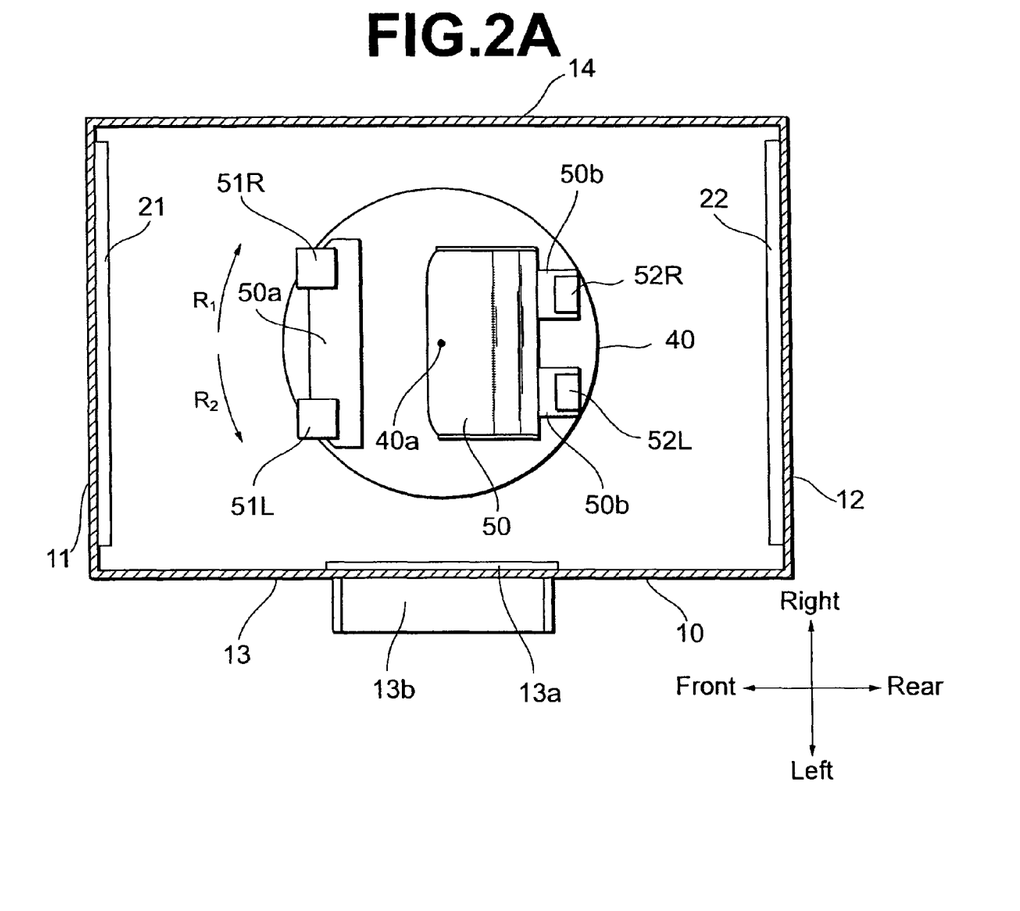
FIG. 2(A) is a plane view of a state where the rotating table of the game apparatus shown in FIG. 1 does not rotate.
Figure 2B:
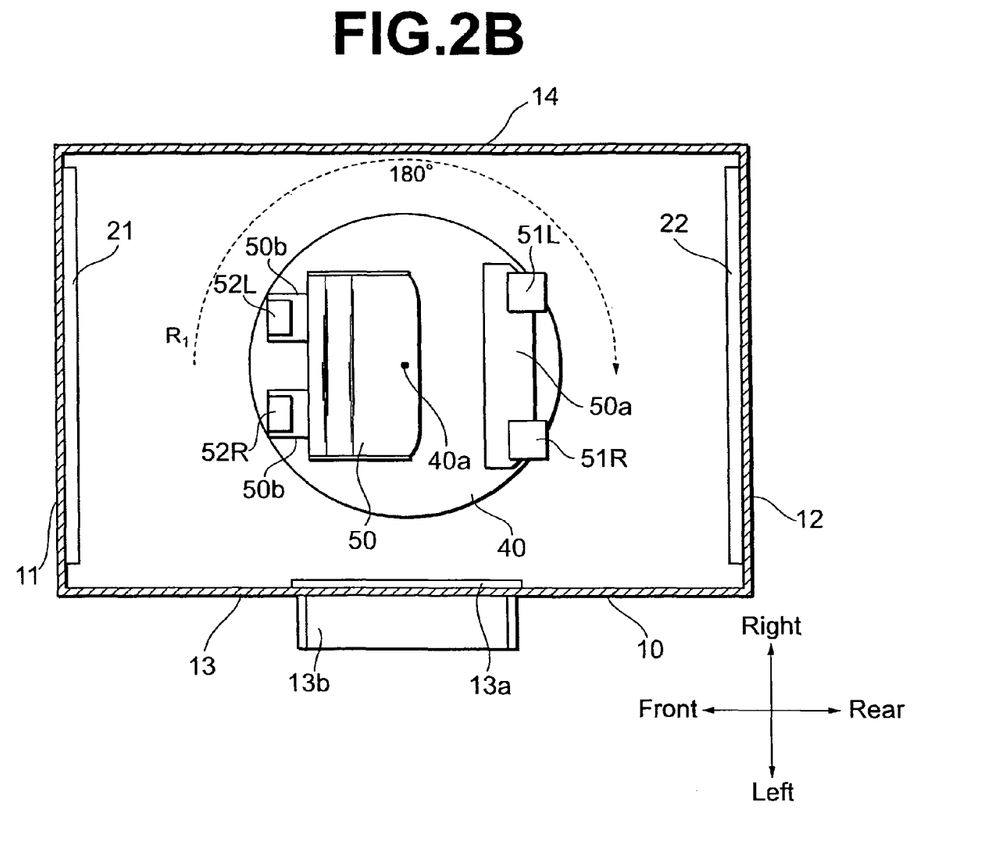
FIG. 2(B) is a plane view showing a state where the rotating table of the game apparatus shown in FIG. 1 is rotated by 180°.
Figure 3:
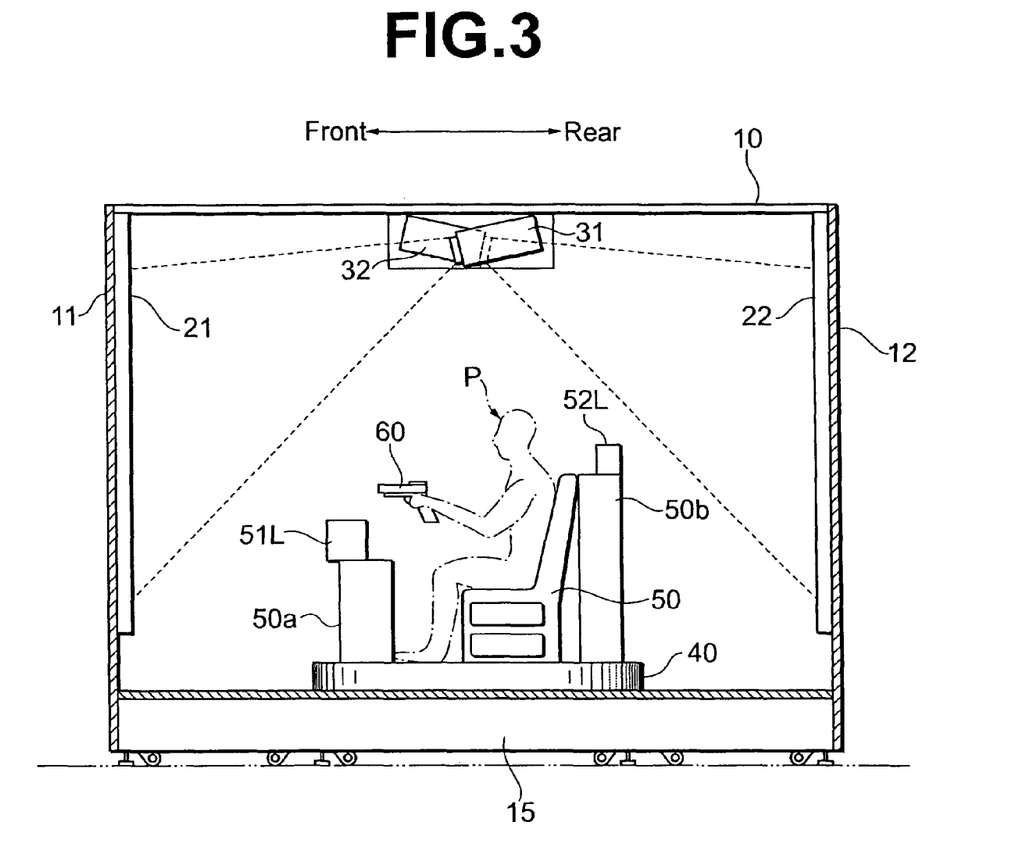
FIG. 3 is a side view of the game apparatus shown in FIG. 1.
Figure 4:
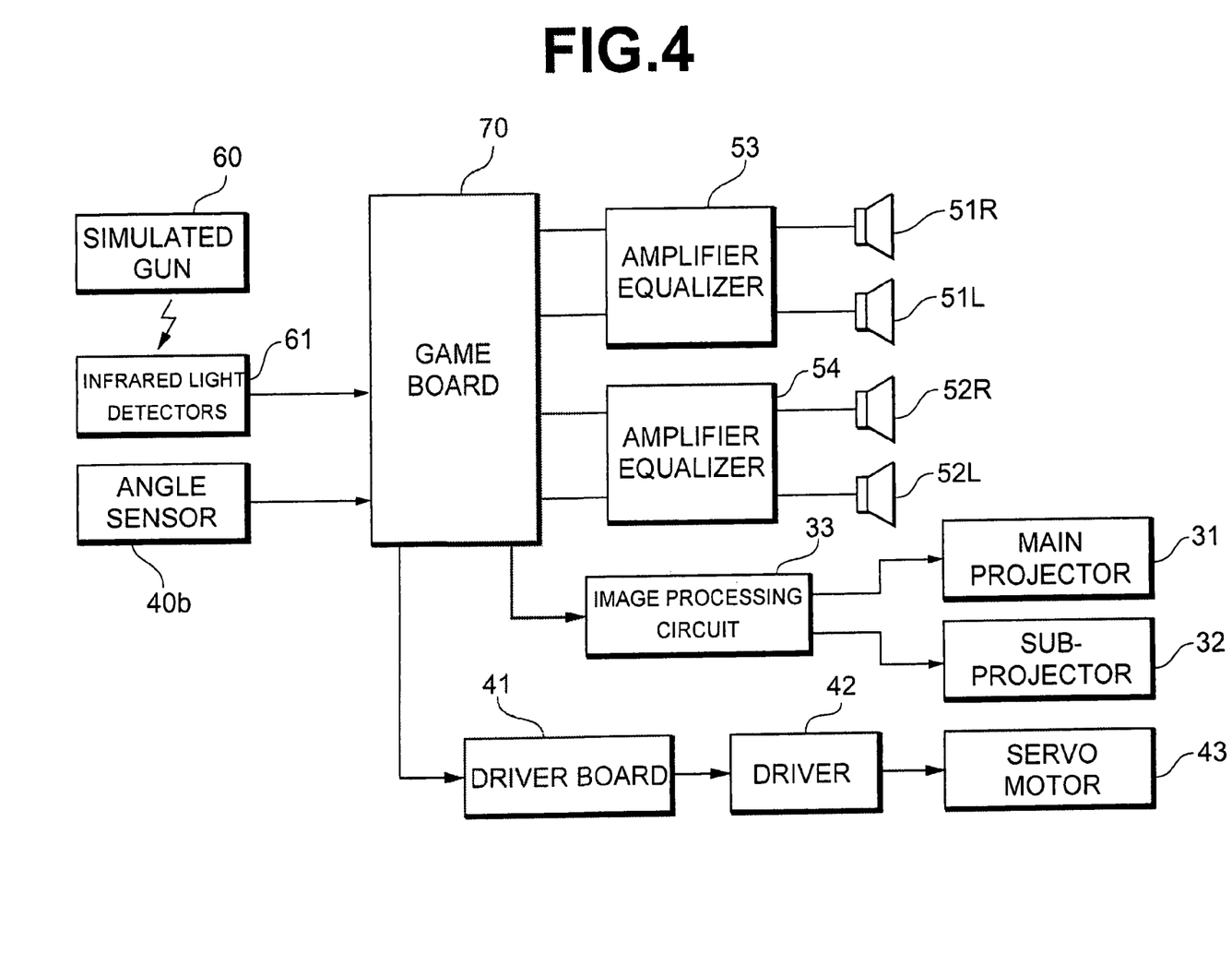
FIG. 4 is a function block view of the game apparatus shown in FIG. 1.
Figure 5:
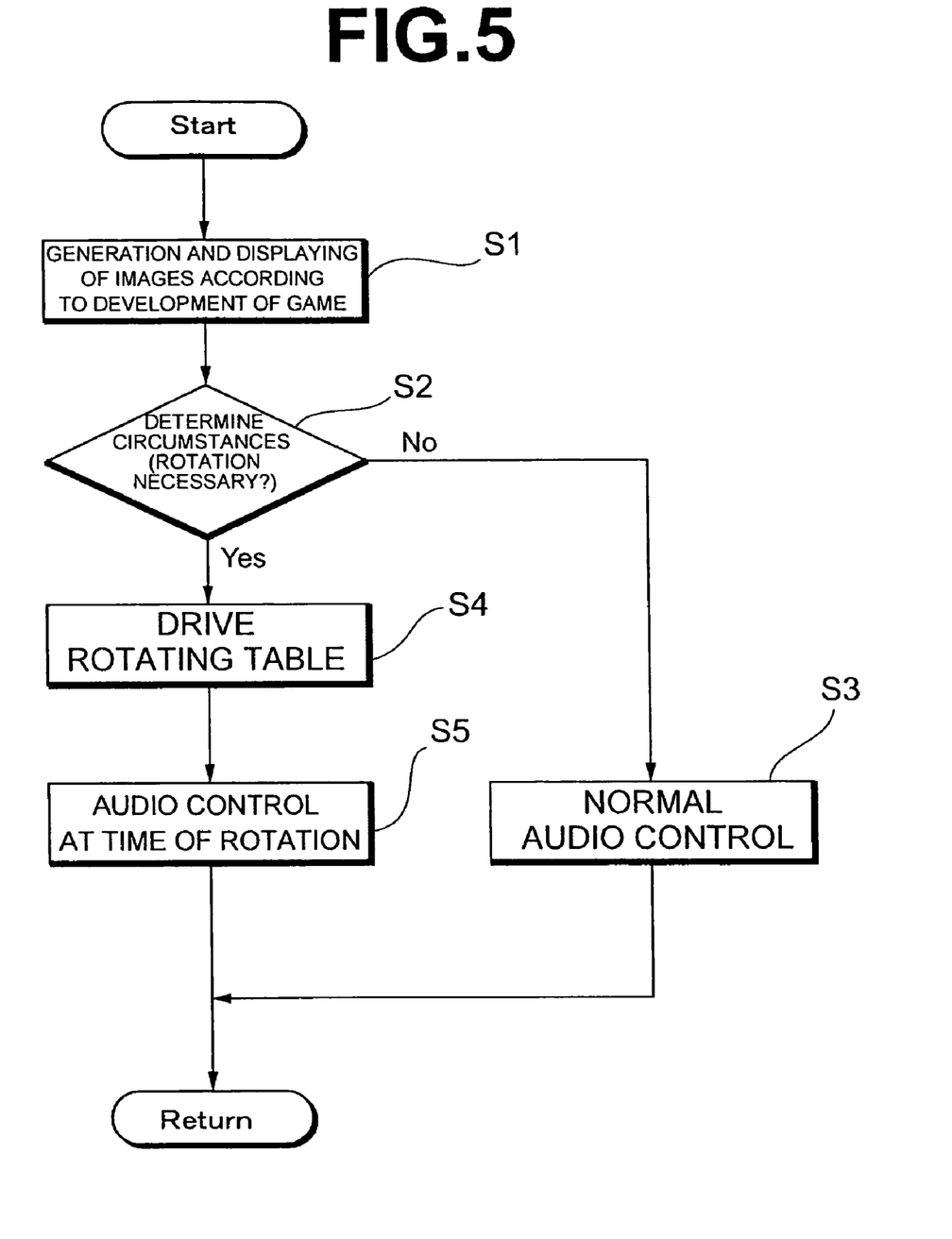
FIG. 5 is a flowchart showing a method for controlling the game apparatus shown in FIG. 1.

The following is a description with reference to FIG. 1 to FIG. 5 of game apparatus of an embodiment of the present invention. FIG. 1, FIG. 2 and FIG. 3 are, respectively, a perspective view, a plane view, and a side view showing a configuration for the essential parts of game apparatus 1 of this embodiment, and FIG. 4 is a function block view of the game apparatus 1 of this embodiment. Further, FIG. 5 is a flowchart showing a method for controlling the game apparatus 1 of this embodiment.

First, a description is given of the configuration of game apparatus 1 of this embodiment using FIG. 1 to FIG. 4.

As shown in FIG. 1 to FIG. 3, game apparatus 1 is comprised of a cabinet 10, a main screen 21 and sub-screen 22 installed at fixed positions within the cabinet 10, a main projector 31 and sub-projector 32 for projecting images to be displayed at the main screen 21 and the sub-screen 22, a rotating table 40 installed in a freely rotating manner at a substantially central part of cabinet 10, a seat 50 and speaker set fixed on the rotating table 40, a simulated gun 60 operated by a game player, and a game board 70 (FIG. 4) for controlling each type of equipment in an integrated manner.

As shown in FIG. 1 to FIG. 3, cabinet 10 is an approximately rectangular parallelepiped shaped enclosure having a front wall 11 and rear wall 12 arranged to the front and rear, a left side wall 13 and right side wall 14 arranged to the left and right, a floor 15 and a ceiling 16, and an internal opening capable of housing two game players P. As shown in FIG. 2, a freely opening and closing door 13a for game players P to exit and enter by is provided at the left side wall 13 of the cabinet 10, and a step 13b is provided below the door 13a.

The main screen 21 and sub-screen 22 display images (an image of a predetermined object in a three-dimensional virtual game space as viewed from a predetermined virtual frame of reference) projected from main projector 31 and sub-projector 32, respectively, and function as the display means of the present invention. In this embodiment, the main screen 21 and the sub-screen 22 are arranged (fixed) at fixed positions (fixed positions sandwiching the seat 50 from the front and the rear) at the front wall 11 and the rear wall 12 within the cabinet 10. Game players P sitting on the seat 50 mainly play the game while looking at an image displayed on the main screen 21.

The main projector 31 and the sub-projector 32 project images (images of predetermined objects in the three-dimensional virtual game space from predetermined virtual frames of reference) processed by an image processing circuit 33 generated by the game board 70 shown in FIG. 4 on the main screen 21 and the sub-screen 22. The image generating means of the present invention is configured from the game board 70, image processing circuit 33, main projector 31 and sub-projector 32.

Rotating table 40 is arranged at a substantially central port on the floor 15 of the cabinet 10 so as to rotate in a direction R1 and direction R2 centrally about a rotating shaft 40a (shaft extending in a vertical direction) shown in FIG. 2. Seat 50 is fixed on the rotating table 40, and is capable of enabling two game players P, P to sit. As a result, the game players P sitting on the seat 50 are able to rotate in direction R1 and direction R2 centrally about the rotating shaft 40a together with the rotating table 40, and are also able to change their relative positions with respect to the main screen 21 and the sub-screen 22.

An angle sensor 40b (FIG. 4) is provided in the vicinity of rotating table 40. The angle sensor 40b detects a rotation angle of rotating table 40 from a reference position (position of the rotating table 40 when the seat 50 is facing the front) shown in FIG. 2(A), and functions as the rotation angle detection means and detection means of the present invention. Information relating to the rotation angle detected by the angle sensor 40b is then sent to the game board 70 and used in audio control.

The speaker set is the audio output means of the present invention, is arranged closer to the seat 50 than the main screen 21 and sub-screen 22, and outputs audio according to the development of the game.

The speaker set of this embodiment is comprised of a pair of front speakers 51R, 51L arranged in a state spaced to the left and right at a fixed position on a pedestal 50a fixed to the front of the seat 50, and a pair of rear speakers 52R, 52L arranged on pillars 50b fixed at fixed positions spaced to the left and right to the rear of the seat 50. The speaker set is therefore fixed on the rotating table 40 and is able to rotate in direction R1 and direction R2 centrally about the rotating shaft 40a together with the rotating table 40, and is also able to change its relative positions with respect to the main screen 21 and the sub-screen 22.

The simulated gun 60 is configured so as to be capable of irradiating infrared radiation when a trigger is pulled. On the other hand, a plurality of infrared light detectors 61 (FIG. 4) are arranged at the inner surface of the front wall 11 and rear wall 12 of the cabinet 10. When a game player P grips the simulated gun 60, lines up the sight on an image of an object displayed on main screen 21 or sub-screen 22, and pulls the trigger, infrared light irradiated from the simulated gun 60 is sensed by one or more of the infrared light detectors 61, and firing direction (direction of irradiation of infrared radiation) is determined based on infrared radiation detection conditions.

The game board 70 has a CPU (Central Processing Unit), memory recorded with various control programs and data, and an input/output interface, etc., controls the various equipment provided at game apparatus 1 in an integrated manner, and controls game development and accompanying image story development. Namely, the game board 70 functions as the game control means and control means of the present invention.

Specifically, the game board 70 controls the main projector 31 (or sub-projector 32) and the image processing circuit 33 in accordance with a game program recorded in memory, and displays images at the main screen 21 (or the sub-screen 22).

During this time, game board 70 reads out three-dimensional data for objects (for example, characters such as enemies) recorded in the memory, calculates behavior of objects in three-dimensional virtual game space, calculates coordinates (first coordinates) for the objects, and calculates coordinates (second coordinates) of predetermined virtual frames of reference in the three-dimensional virtual game space. Further, the game board 70 calculates coordinates (third coordinates) for objects on an enclosure coordinate system taking a predetermined position within the cabinet 10 (for example, a fixed point in the vicinity of the seat 50 arranged on the rotating shaft 40a) as an origin from the coordinates (first and second coordinates) of the objects and the virtual frames of reference. The game board 70 then synthesizes data for the enclosure coordinate system and character information etc. so as to generate an image, and this image is displayed at the main screen 21 (or sub-screen 22) via the image processing circuit 33 and the main projector 31 (or sub-projector 32).

The game board 70 then calculates the coordinates (fourth coordinates) of the object in a seat coordinate system taking the center of rotation in the vicinity of the seat 50 arranged on the rotating shaft 40a as an origin from the coordinates (third coordinates) of the objects in the enclosure coordinate system and the rotation angle of the rotating table 40 (seat 50 and speaker set). The game board 70 calculates the distance (virtual distance information) and direction (virtual angle information) from the position of game player P sitting on the seat 50 (the position of a rotational center) to an object based on the coordinates (fourth coordinates) of the object in the seat coordinate system. Information relating to the calculated distance and direction is then used in audio control.

In this embodiment, the origin of the enclosure coordinate system (fixed point in the vicinity of seat 50 arranged on the rotating shaft 40a) and the origin of the seat coordinate system (rotational center), and virtual frames of reference coincide, but by no means have to coincide. Further, in this embodiment, the position of the rotational center coincides with the position of the game player P but the position of the game player P may be calculated separately, and the distance and direction from this position to the object may be calculated.

Moreover, game board 70 calculates the rotation angle of the rotating table 40 in accompaniment with the development of the game in accordance with the game program recorded in memory, controls driving of a servomotor 43 so as to bring about the calculated rotation angle, and causes the rotating table 40 (including the seat 50 and speaker set) to rotate.

During this time, the game board 70 outputs a predetermined instruction signal to a driver board 41 shown in FIG. 4. The driver board 41 receiving the instruction signal from the game board 70 then generates a drive signal in order to rotatably drive the rotating table 40. A driver 42 receiving the drive signal from the driver board 41 then causes the servomotor 43 to rotate. As a result, the rotating table 40, seat 50, and speaker set are rotated by a predetermined time and angle. Namely, the game board 70, driver board 41, driver 42, servomotor 43 and rotating table 40 change the relative positions of the seat 50 and the speaker set with respect to the main screen 21 and sub-screen 22, and constitute the position changing means of the present invention. Further, the game board 70, driver board 41, driver 42 and servomotor 43 constitute the rotation control means of the present invention.

Moreover, the game board 70 outputs audio signals independently to each speaker, drives the front speakers 51R, 51L via an amplifier/equalizer 53 shown in FIG. 4, and drives the rear speakers 52R, 52L via an amplifier/equalizer 54 so as to generate audio independently from each speaker.

During this time, game board 70 controls the output conditions of the audio outputted from the speaker set based on the display conditions for the images displayed at the main screen 21 and the sub-screen 22 and the relative positions of the seat 50 and the speaker set with respect to the main screen 21 and the sub-screen 22. Specifically, the game board 70 calculates the coordinates (fourth coordinates) of objects in the seat coordinate system from the coordinates (third coordinates) of objects in the enclosure coordinate system constituting images displayed at the main screen 21 and the sub-screen 22 and the rotation angle of the rotating table 40 (seat 50 and speaker set) detected by the angle sensor 40b. The game board 70 determines the distance and direction from the position of the game player P sitting on the seat 50 to the object based on the coordinates of the object in the seat coordinate system, and controls output conditions for the audio outputted from the speaker set based on the results of this determination. Namely, the game board 70 functions as the stereophonic sound control means of the present invention.

For example, in the event that the object (enemy) is displayed at the right side of the main screen 21, and the rotation angle of the rotating table 40 (seat 50) is 0° (i.e. there is no rotation), as shown in FIG. 2(A), as the front speaker 51R is arranged at a position closest to the right side of the main screen 21, the game board 70 makes the audio outputted from the front speaker 51R louder than the audio outputted from another speaker set. On the other hand, in the event that the object (enemy) is displayed at the right side of the main screen 21, and the rotation angle of the rotating table 40 (seat 50) is 1800, as shown in FIG. 2(B), as the rear speaker 52L is arranged at a position closest to the right side of the main screen 21, the game board 70 makes the audio outputted from the rear speaker 52L louder than the audio outputted from the other speaker set.

Next, a description is given of a method for controlling the game apparatus 1 of this embodiment using the flowchart of FIG. 5.

First, the game board 70 of the game apparatus 1 calculates the coordinates of the predetermined object in the three-dimensional virtual space and the coordinates of the virtual frame of reference according to the development of the game, calculates the coordinates of the object in an enclosure coordinate system taking a predetermined position within the cabinet 10 as an origin from the object and virtual frame of reference coordinates, and generates images by synthesizing data for the enclosure coordinate system and character information, etc. The game board 70 then displays these images at the main screen 21 (or sub-screen 22) via the image processing circuit 33 and the main projector 31 (or sub-projector 32.) (image generation and display step: S1).

Next, the game board 70 determines whether or not the circumstances of the game require the seat (game player P) to be rotated (circumstances determination step: S2). In the event that it is determined in circumstances determination step S2 that rotation of the seat 50 (game player P) is not necessary, the game board 70 carries out normal audio control (normal stereophonic sound control step: S3). In the normal stereophonic sound control step S3, the game board 70 outputs audio signals corresponding to the development of the game to each speaker independently, and drives each speaker via the amplifier/equalizer.

On the other hand, in the event that it is determined in circumstances determination step S2 that game circumstances are such that rotation of the seat 50 (game player P) is necessary, the game board 70 drives and controls the servomotor 43 via the driver board 41 and the driver 42, and rotates the rotating table 40 (including the seat 50 and the speaker set) for a predetermined period and through a predetermined angle (rotating table drive step: S4). In the rotating table drive step S4, the relative positions of the seat 50 and the speaker set are changed with respect to the main screen 21 and the sub-screen 22, and this step corresponds to the position changing step and rotation control step of the present invention.

Further, the game board 70 implements the rotating table drive step S4 and controls the output conditions of the audio outputted from the speaker set based on the display conditions for the images displayed at the main screen 21 and the sub-screen 22 and the relative positions of the seat 50 and the speaker set with respect to the main screen 21 and the sub-screen 22 (stereophonic sound control step at the time of rotation: S5). Stereophonic sound control step at the time of rotation S5 contains a step of detecting rotation angle of the rotating table 40 using the angle sensor 40b, and corresponds to the detection step, rotation angle detection step, and stereophonic sound control step of the present invention. The game board 70 then repeatedly executes the above set of steps until the game is over.

With the game apparatus 1 of the embodiment described above, it is possible to change conditions of audio output outputted from each speaker and control an assigned position of a sound field of stereophonic sound based on display conditions of images displayed at the main screen 21 (sub-screen 22) and the relative positions of the seat 50 and speaker set with respect to the main screen 21 (sub-screen 22). For example, it is possible to control the audio output conditions in such a manner so as to output loud audio from the speaker that has been moved to a position closest to the right side of the main screen 21 even in cases where an image of the object is displayed at the right side of the main screen 21 and the seat 50 and each speaker are made to move (made to change position). It is therefore possible to match image display conditions and audio output conditions, and it is possible to subject a game player P to audiovisual synergetic effects so as to increase the sense of realism. In other words, it is possible to control a position assigned to a sound field of stereophonic sound even in cases where the seat 50 and the game player P are rotatably moved, and relieve discomfort.

The present invention is by no means limited to the embodiment described above, and various modifications are possible without deviating from the spirit of the present invention. For example, the display means may be arranged positioned in an arbitrary manner about the periphery such as to the front, rear, left and right of the cabinet 10, and three or more display means may also be provided. Further, the images generated by the game board 70 can also be displayed at television monitors rather than being displayed at the main screen 21 (or sub-screen 22) using the main projector 31 (or the sub-projector 32). Television monitors in this enclosure then correspond to the display means of the present invention.

Further, conditions for changing the positions of the seat 50 and speaker set with respect to the main screen 21 and sub-screen 22 (display means) are by no means limited to the examples shown in the above embodiment. For example, it is also possible to change the relative positions of the seat 50 and the speaker set with respect to the main screen 21 and the sub-screen 22 by rotating the seat 50 and the speaker set centered about an axis (roll axis) extending in a direction from front to rear or an axis (pitch axis) extending in a direction from left to right within the cabinet 10. In this case also, rotation angle information for about the roll axis and pitch axis is detected by an angle sensor, and the same effects as for the embodiment described above can then be obtained by using the detected information in audio control.

Further, it is possible to change the relative positions of the seat 50 and the speaker set with respect to the main screen 21 and the sub-screen 22 by moving the seat 50 and the speaker set in a forward and backward direction, left to right direction, or up and down direction in a rectilinear manner within the cabinet 10. In this case, it is possible to obtain the same results as for the above embodiments by detecting movement distance information and movement speed information for the forward and backward direction, left to right direction, and up and down direction and using the detected information in audio control.

Further, it is also possible to change the relative positions of the seat 50 and the speaker set with respect to the display means by fixing the seat 50 and the speaker set within the cabinet 10, and rotatably moving the display means (main screen 21 and sub-screen 22) about a vertical axis (or roll/pitch axis) or through rectilinear movement in a direction from front to rear (or left to right, up and down). In this case also, rotation angle information and movement distance/speed information for the display means is detected, and the same effects as for the embodiment described above can then be obtained by using the detected information in audio control.

Further, the number and positions of the speakers that are the audio output means are by no means limited to the example shown in the above embodiment. For example, it is also possible to arrange two pairs (giving a total of four) of upper and lower pairs of left and right speakers to the front of the seat 50 and two pairs (giving a total of four) of upper and lower pairs of left and right speakers to the rear of the seat 50. In this case also, it is also possible to obtain the same effects as for the embodiment described above by detecting speaker set rotation angle information using angle sensors, and independently control the output conditions of audio outputted from each of the eight speakers.

Further, in the above embodiment, an example is shown where a speaker set rotatably moving together with the seat 50 arranged and to the front and rear and left and right of the seat 50 is adopted as the audio output means, but it is also possible to adopt a plurality of headphone-type speakers outputting sound from front and rear and left and right positions in the vicinity of the head of the game player P. In this case also, rotation angle information for about each headphone-type speaker is detected by an angle sensor, and the same effects as for the embodiment described above can then be obtained by using the detected information in audio control.

Further, in the above embodiment, an example of carrying out stereophonic control based on rotation angle information of rotating table 40 detected by angle sensor 40b is shown, but it is also possible to provide stereophonic audio control based on rotation angle of the rotating table 40 calculated in accordance with development of the game without providing angle sensor 40b.

What is claimed is:

1. A control method for a game apparatus, the apparatus comprising
    game control means for controlling development of a game based on a predetermined game program,
    image generating means for generating game images based on development of the game controlled by the game control means,
    a plurality of display means for displaying the game images generated by the image generating means,
    a seat for a game player to sit on, and
    a plurality of audio output means,
the method comprising:
    calculating, using a processor, in a position changing step, an amount of change for at least one of orientation and relative positional relationship of the seats and the output means with respect to the plurality of display means in accompaniment with development of the game by the game control means, and changing at least one of the orientation and relative positional relationship of the seat and the audio output means with respect to the plurality of display means based on calculated amount of change;
    changing, in a stereophonic sound control step, conditions of audio output outputted from the plurality of audio output means and controlling assigned position of a sound field of stereophonic sound based on information relating to the amount of change;
    generating, by the image generating means, an image of a predetermined object in three-dimensional virtual game space as viewed from a predetermined virtual frame of reference,
    displaying, by the plurality of display means, images as viewed from the virtual frame of reference;
    changing the relative positions of the seat and the plurality of audio output means with respect to the plurality of display means by causing the seat and the plurality of audio output means to rotate taking a predetermined center of rotation arranged within an enclosure as center, and;
    changing conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

2. A control method for a game apparatus, the apparatus comprising
    game control means for controlling development of a game based on a predetermined game program,
    image generating means for generating game images based on development of the game controlled by the game control means,
    a plurality of display means for displaying the game images generated by the image generating means,
    a seat for a game player to sit on, and
    a plurality of audio output means,
the method comprising:
    changing, using a processor, in a position changing step, at least one of orientation and relative positional relationship of the seat and the audio output means with respect to the plurality of display means in accompaniment with the development of the game by the game control means;
    detecting, in a detection step, an amount of change of at least one of orientation and relative positional relationship of the seat and the audio output means with respect to the plurality of display means;
    changing, in a stereophonic sound control step, conditions of audio output outputted from the plurality of audio output means and controlling assigned position of a sound field of stereophonic sound based on information relating to the amount of change detected by the detection step;
    generating, by the image generating means, an image of a predetermined object in three-dimensional virtual game space as viewed from a predetermined virtual frame of reference;
    displaying, by the plurality of display means, images as viewed from the virtual frame of reference;
    changing the relative positions of the seat and the plurality of audio output means with respect to the plurality of display means by causing the seat and the plurality of audio output means to rotate taking a predetermined center of rotation arranged within an enclosure as center, and, changing conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

3. A method of controlling game apparatus, the apparatus comprising
control means for controlling development of an image story based on a predetermined game program,
image generating means for generating images based on image story development controlled by the control means,
at least two display means provided with display surfaces facing each other for displaying the images generated by the image generating means,
a seat for a game player to sit on,
a plurality of audio output means, and
a rotating table with the seat and the audio output means provided between the display means,
the method comprising:
calculating, using a processor, in a rotation control step, a rotation angle of the rotating table with respect to at least two of the display means in accompaniment with development of the image story of the control means, and causing the rotating table to rotate based on calculated rotation angle;
changing, in a stereophonic sound control step, conditions of audio output outputted from the plurality of audio output means and controlling assigned position of a sound field of stereophonic sound based on information relating to the rotation angle of the rotating table;
generating, by the image generating means, an image of a predetermined object in three-dimensional virtual game space as viewed from a predetermined virtual frame of reference,
displaying, by the at least two display means, images as viewed from the virtual frame of reference;
changing the relative positions of the seat and the plurality of audio output means with respect to the plurality of display means by causing the seat and the plurality of audio output means to rotate taking a predetermined center of rotation arranged within an enclosure as center, and;
changing conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

4. A method of controlling game apparatus, the apparatus comprising
control means for controlling development of an image story based on a predetermined game program,
image generating means for generating images based on image story development controlled by the control means,
at least two display means provided with display surfaces facing each other, for displaying the images generated by the image generating means,
a seat for a game player to sit on,
a plurality of audio output means, and
a rotating table with the seat and the audio output means provided between the display means,
the method comprising:
causing, in a rotation control step, the rotating table to rotate with respect to at least two of the display means in accompaniment with development of the image story of the control means;
detecting, in a rotation angle detection step, rotation angle of the rotating table;
changing, using a processor, in a stereophonic sound control step, conditions of audio output outputted from the plurality of audio output means and controlling assigned position of a sound field of stereophonic sound based on information relating to the rotation angle detected in the rotation angle detection step;
generating, by the image generating means, an image of a predetermined object in three-dimensional virtual game space as viewed from a predetermined virtual frame of reference;
displaying, by the plurality of display means, images as viewed from the virtual frame of reference;
changing the relative positions of the seat and the plurality of audio output means with respect to the plurality of display means by causing the seat and the plurality of audio output means to rotate taking a predetermined center of rotation arranged within an enclosure as center, and,
changing conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

5. A game apparatus comprising:
game control means for controlling development of a game based on a predetermined game program;
image generating means for generating game images based on development of the game controlled by the game control means;
a plurality of display means for displaying the game images generated by the image generating means;
a seat for a game player to sit on;
a plurality of audio output means;
position changing means for calculating an amount of change for at least one of orientation and relative positional relationship of the seats and the audio output means with respect to the plurality of display means in accompaniment with development of the game by the game control means, and changing at least one of the orientation and relative positional relationship of the seat and the audio output means with respect to the plurality of display means based on calculated amount of change; and
stereophonic sound control means for changing conditions of audio output outputted from the plurality of audio output means and controlling assigned position of a sound field of stereophonic sound based on information relating to the amount of change;
wherein:
the image generating means generates an image of a predetermined object in three-dimensional virtual game space as viewed from a predetermined virtual frame of reference,
the plurality of display means display images as viewed from the virtual frame of reference;
the position changing means changes the relative positions of the seat and the plurality of audio output means with respect to the plurality of display means by causing the seat and the plurality of audio output means to rotate taking a predetermined center of rotation arranged within an enclosure as center, and, the stereophonic sound control means changes conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

6. The game apparatus of claim 5, wherein the stereophonic sound control means:

calculates a third coordinate that is a coordinate for the object in an enclosure coordinate system taking a predetermined position within the enclosure as an origin from a first coordinate that is a coordinate of the object in the three-dimensional virtual game space and a second coordinate that is a coordinate for the virtual frame of reference in the three-dimensional virtual game space, calculates a fourth coordinate that is a coordinate for, the object in a seat coordinate system taking a center of rotation as an origin from the third coordinate and the rotation angle of the seat and the plurality of audio output means, determines a distance and direction from the game player sitting on the seat to the object based on the fourth coordinate, changes conditions of audio output outputted from the plurality of audio output means, and controls assigned position of a sound field of stereophonic sound based on the results of this determination.

7. A game apparatus comprising:

game control means for controlling development of a game based on a predetermined game program;

image generating means for generating game images based on development of the game controlled by the game control means;

a plurality of display means for displaying the game images generated by the image generating means;

a seat for a game player to sit on;

a plurality of audio output means;

position changing means for calculating an amount of change for at least one of orientation and relative positional relationship of the seats and the audio output means with respect to the plurality of display means in accompaniment with development of the game by the game control means, and changing at least one of the orientation and relative positional relationship of the seat and the audio output means with respect to the plurality of display means based on calculated amount of change; and stereophonic sound control means for changing conditions of audio output outputted from the plurality of audio output means and controlling assigned position of a sound field of stereophonic sound based on information relating to the amount of change;

wherein:

the plurality of display means are fixed so as to sandwich the seat, and the position changing means simultaneously changes the relative positions of the seat and the plurality of audio output means with respect to the plurality of display means by moving the seat and the plurality of audio output means at the same time.

8. The game apparatus according to claim 7, wherein the plurality of audio output means are arranged at the seat or in the vicinity of the seat, and are arranged integrally with the seat or separately from the seat.

9. The game apparatus according to claim 7, wherein the plurality of audio output means comprise at least a pair of speakers fixed in a spaced manner to the left and right of the seat, or at least a pair of speakers mounted at the game player spaced to the left and right of the game player.

10. The game apparatus according to claim 7, wherein the plurality of audio output means have a left and right pair of front speakers fixed in a spaced manner to the left and right to the front of the seat, and a left and right pair of rear speakers spaced to the left and right to the rear of the seat.

11. The game apparatus according to claim 7, wherein:

the image generating means generates an image of a predetermined object in three-dimensional virtual game space as viewed from a predetermined virtual frame of reference;

the plurality of display means display images as viewed from the virtual frame of reference;

the position changing means changes the relative positions of the seat and the plurality of audio output means with respect to the plurality of display means by causing the seat and the plurality of audio output means to rotate taking a predetermined center of rotation arranged within an enclosure as center, and, the stereophonic sound control means changes conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

12. The game apparatus of claim 11, wherein the stereophonic sound control means:

calculates a third coordinate that is a coordinate for the object in an enclosure coordinate system taking a predetermined position within the enclosure as an origin from a first coordinate that is a coordinate of the object in the three-dimensional virtual game space and a second coordinate that is a coordinate for the virtual frame of reference in the three-dimensional virtual game space, calculates a fourth coordinate that is a coordinate for the object in a seat coordinate system taking a center of rotation as an origin from the third coordinate and the rotation angle of the seat and the plurality of audio output means, determines a distance and direction from the game player sitting on the seat to the object based on the fourth coordinate, changes conditions of audio output outputted from the plurality of audio output means, and controls assigned position of a sound field of stereophonic sound based on the results of this determination.

13. A game apparatus comprising:

game control means for controlling development of a game based on a predetermined game program;

image generating means for generating game images based on development of the game controlled by the game control means;

a plurality of display means for displaying the game images generated by the image generating means;

a seat for a game player to sit on;

a plurality of audio output means;

position changing means for changing at least one of orientation and relative positional relationship of the seat and the audio output means with respect to the plurality of display means in accompaniment with the development of the game by the game control means;

detection means for detecting an amount of change of at least one of orientation and relative positional relationship of the seat and the audio output means with respect to the plurality of display means; and stereophonic sound control means for changing conditions of audio output outputted from the plurality of audio output means and controlling assigned position of a sound field of stereophonic sound based on information relating to the amount of change detected by the detection means;

wherein:

the image generating means generates an image of a predetermined object in three-dimensional virtual game space as viewed from a predetermined virtual frame of reference, the plurality of display means display images as viewed from the virtual frame of reference;

the position changing means changes the relative positions of the seat and the plurality of audio output means with respect to the plurality of display means by causing the seat and the plurality of audio output means to rotate taking a predetermined center of rotation arranged within an enclosure as center, and, the stereophonic sound control means changes conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

14. The game apparatus of claim 13, wherein the stereophonic sound control means:

calculates a third coordinate that is a coordinate for the object in an enclosure coordinate system taking a predetermined position within the enclosure as an origin from a first coordinate that is a coordinate of the object in the three-dimensional virtual game space and a second coordinate that is a coordinate for the virtual frame of reference in the three-dimensional virtual game space, calculates a fourth coordinate that is a coordinate for the object in a seat coordinate system taking a center of rotation as an origin from the third coordinate and the rotation angle of the seat and the plurality of audio output means, determines a distance and direction from the game player sitting on the seat to the object based on the fourth coordinate, changes conditions of audio output outputted from the plurality of audio output means, and controls assigned position of a sound field of stereophonic sound based on the results of this determination.

15. A game apparatus comprising:

game control means for controlling development of a game based on a predetermined game program;

image generating means for generating game images based on development of the game controlled by the game control means;

a plurality of display means for displaying the game images generated by the image generating means;

a seat for a game player to sit on;

a plurality of audio output means;

position changing means for changing at least one of orientation and relative positional relationship of the seat and the audio output means with respect to the plurality of display means in accompaniment with the development of the game by the game control means;

detection means for detecting an amount of change of at least one of orientation and relative positional relationship of the seat and the audio output means with respect to the plurality of display means; and stereophonic sound control means for changing conditions of audio output outputted from the plurality of audio output means and controlling assigned position of a sound field of stereophonic sound based on information relating to the amount of change detected by the detection means;

wherein:

the plurality of display means are fixed so as to sandwich the seat, and the position changing means simultaneously changes the relative positions of the seat and the plurality of audio output means with respect to the plurality of display means by moving the seat and the plurality of audio output means at the same time.

16. The game apparatus according to claim 15, wherein the plurality of audio output means are arranged at the seat or in the vicinity of the seat, and are arranged integrally with the seat or separately from the seat.

17. The game apparatus according to claim 15, wherein the plurality of audio output means comprise at least a pair of speakers fixed in a spaced manner to the left and right of the seat, or at least a pair of speakers mounted at the game player spaced to the left and right of the game player.

18. The game apparatus according to claim 15, wherein the plurality of audio output means have a left and right pair of front speakers fixed in a spaced manner to the left and right to the front of the seat, and a left and right pair of rear speakers spaced to the left and right to the rear of the seat.

19. The game apparatus according to claim 15, wherein:

the image generating means generates an image of a predetermined object in three-dimensional virtual game space as viewed from a predetermined virtual frame of reference, the plurality of display means display images as viewed from the virtual frame of reference;

the position changing means changes the relative positions of the seat and the plurality of audio output means with respect to the plurality of display means by causing the seat and the plurality of audio output means to rotate taking a predetermined center of rotation arranged within an enclosure as center, and, the stereophonic sound control means changes conditions of audio output outputted from the plurality of audio output means and controls assigned position of a sound field of stereophonic sound based on virtual distance information for between the position of the object and the seat in three-dimensional virtual space and rotation angle information for the seat and the plurality of audio output means.

20. The game apparatus of claim 19, wherein the stereophonic sound control means:

calculates a third coordinate that is a coordinate for the object in an enclosure coordinate system taking a predetermined position within the enclosure as an origin from a first coordinate that is a coordinate of the object in the three-dimensional virtual game space and a second coordinate that is a coordinate for the virtual frame of reference in the three-dimensional virtual game space, calculates a fourth coordinate that is a coordinate for the object in a seat coordinate system taking a center of rotation as an origin from the third coordinate and the rotation angle of the seat and the plurality of audio output means, determines a distance and direction from the game player sitting on the seat to the object based on the fourth coordinate, changes conditions of audio output outputted from the plurality of audio output means, and controls assigned position of a sound field of stereophonic sound based on the results of this determination.

* * * * *